US008576855B2

(12) United States Patent
Sorrini et al.

(10) Patent No.: US 8,576,855 B2
(45) Date of Patent: Nov. 5, 2013

(54) SYSTEM AND METHOD OF INTERFACE ASSOCIATION FOR INTERFACE OPERATIONAL STATUS EVENT MONITORING

(75) Inventors: Piero Sorrini, Ottawa (CA); Andrew Molotchko, Kanata (CA); John Fischer, Stittsville (CA); Alp Dibirdi, Kanata (CA)

(73) Assignee: Alcatel Lucent, Paris (FR)

( * ) Notice: Subject to any disclaimer, the term of this patent is extended or adjusted under 35 U.S.C. 154(b) by 953 days.

(21) Appl. No.: 11/434,800

(22) Filed: May 17, 2006

(65) Prior Publication Data
US 2007/0268916 A1   Nov. 22, 2007

(51) Int. Cl.
 *H04L 12/28* (2006.01)
 *H04J 3/16* (2006.01)

(52) U.S. Cl.
 USPC .................. 370/401; 370/466; 370/395.6

(58) Field of Classification Search
 USPC ........................ 370/466, 395.6, 401
 See application file for complete search history.

(56) References Cited

U.S. PATENT DOCUMENTS

| | | | | |
|---|---|---|---|---|
| 5,636,206 A * | 6/1997 | Amemiya et al. | ............ | 370/244 |
| 5,748,098 A * | 5/1998 | Grace | ............ | 702/181 |
| 5,757,798 A * | 5/1998 | Hamaguchi | ............ | 370/397 |
| 5,901,352 A * | 5/1999 | St-Pierre et al. | ............ | 455/426.1 |
| 5,943,338 A * | 8/1999 | Duclos et al. | ............ | 370/395.65 |
| 5,991,276 A * | 11/1999 | Yamamoto | ............ | 370/260 |
| 6,052,722 A * | 4/2000 | Taghadoss | ............ | 709/223 |
| 6,205,563 B1 * | 3/2001 | Lewis | ............ | 714/47.3 |
| 6,226,260 B1 * | 5/2001 | McDysan | ............ | 370/216 |
| 6,665,295 B1 * | 12/2003 | Burns et al. | ............ | 370/389 |
| 6,744,726 B1 * | 6/2004 | Minami | ............ | 370/217 |
| 6,748,432 B1 * | 6/2004 | Du et al. | ............ | 709/224 |
| 6,826,196 B1 * | 11/2004 | Lawrence | ............ | 370/466 |
| 7,046,680 B1 * | 5/2006 | McDysan et al. | ............ | 370/396 |
| 7,181,141 B1 * | 2/2007 | Kapur et al. | ............ | 398/58 |
| 7,315,510 B1 * | 1/2008 | Owens et al. | ............ | 370/218 |
| 7,336,648 B1 * | 2/2008 | Sasagawa | ............ | 370/351 |
| 8,145,789 B1 * | 3/2012 | Stamler et al. | ............ | 709/244 |
| 2001/0027491 A1 * | 10/2001 | Terretta et al. | ............ | 709/238 |
| 2001/0040870 A1 * | 11/2001 | Ohmori et al. | ............ | 370/216 |
| 2002/0136223 A1 * | 9/2002 | Ho | ............ | 370/395.51 |
| 2003/0112760 A1 * | 6/2003 | Puppa et al. | ............ | 370/241.1 |
| 2003/0174729 A1 * | 9/2003 | Heink et al. | ............ | 370/466 |
| 2003/0189926 A1 * | 10/2003 | Watanabe et al. | ............ | 370/389 |
| 2004/0008988 A1 * | 1/2004 | Gerstal et al. | ............ | 398/45 |

(Continued)

FOREIGN PATENT DOCUMENTS

| | | |
|---|---|---|
| EP | 1 150 214 A1 | 10/2001 |
| EP | 1 435 754 A1 | 7/2004 |
| WO | WO 02/15493 | 2/2002 |

OTHER PUBLICATIONS

Sorrini, Piero. "System and Method of Interface Association for Interface Operational Status Event Monitoring." U.S. Appl. No. 11/434,800, filed May 17, 2006. U.S. Patent and Trademarks Office.*

*Primary Examiner* — Mark Rinehart
*Assistant Examiner* — Andrew Oh
(74) *Attorney, Agent, or Firm* — Kramer & Amado P.C

(57) ABSTRACT

A system and method for interface association between an ATM interface and a GigE/IP interface of a routing switch platform (RSP) to enable network management of a redundant pair of RSPs which serve as an interface between GigE/IP and ATM are provided.

21 Claims, 3 Drawing Sheets

(56) References Cited

U.S. PATENT DOCUMENTS

| | | | |
|---|---|---|---|
| 2004/0042418 A1* | 3/2004 | Hamada et al. | 370/256 |
| 2005/0146426 A1* | 7/2005 | Pereira et al. | 340/506 |
| 2005/0152366 A1* | 7/2005 | Heuck | 370/390 |
| 2005/0169279 A1* | 8/2005 | Magd et al. | 370/395.5 |
| 2005/0259571 A1* | 11/2005 | Battou | 370/217 |
| 2006/0002370 A1* | 1/2006 | Rabie et al. | 370/351 |
| 2007/0230483 A1* | 10/2007 | Thorne et al. | 370/401 |
| 2007/0268916 A1* | 11/2007 | Sorrini et al. | 370/401 |
| 2008/0276135 A1* | 11/2008 | Granath | 714/57 |

* cited by examiner

SYSTEM AND METHOD OF INTERFACE ASSOCIATION FOR INTERFACE OPERATIONAL STATUS EVENT MONITORING

FIELD OF THE INVENTION

The invention relates to redundancy switching in a communications network and more particularly to a system and method for interface association to enable network management of a redundant pair of root nodes which serve as an interface between GigE/IP and ATM.

BACKGROUND OF THE INVENTION

Service providers delivering video services typically will include redundant links from a video server to the head end routing switch platforms so that delivery of video trough the communications network to the end user/video subscribers is ensured in the event of a failure in one of the links. In order for redundant links to work, some mechanism must be capable of detecting a condition corresponding to failure along the link providing service. Typically detection is accompanied with an alarm which is sent back to a network management system which makes appropriate changes to the system to ensure routing and forwarding of the video transmissions to their intended recipient subscribers.

Referring now to FIG. 1, known redundant delivery of video services in an ATM network 400 is described. A video server 100 is coupled to a first and a second routing switch platform 140, 142 over a first ATM link 110 and a second ATM link 120 respectively. The first routing switch platform 140 acts as a root node for a first point to multipoint (P2MP) ATM connection 150 for delivering video to a number of video subscribers 90 while the second routing switch platform acts as a root node for a second P2MP ATM connection 152. A network management system (NMS) 200 monitors and administrates the first and second routing switch platforms 140 and 142 via a first control link 210 and a second control link 220 respectively. Typically this NMS 200 understands how to manage multi-endpoint paths (MEPs) such as the P2MP connections 150, 152. Each routing switch platform 140, 142 has an ATM input interface acting as the single root point in the respective point to multi-point connection. The first routing switch platform 140 has a first ATM input interface 141 for the first P2MP connection 150, and the second routing switch platform 142 has a second ATM input interface 143 for the second P2MP connection 152.

The P2MP video signals propagate through the remaining network 400 to leaf node DSLAMs (digital subscriber line access multiplexers) 301, 302, 303 which finally are coupled to and deliver the video service to video subscribers 90 (VSs). Two leaf node DSLAMs 301, 302 are coupled to one video subscriber 90 each, while one leaf node DSLAM 303 is coupled to three video subscribers 90. In the system shown in FIG. 1, typically each virtual channel over ATM identified by a VPI/VCI (virtual path identifier/virtual channel identifier) corresponds to a single TV channel.

In known systems, video streams may or may not be delivered at the same time over both of the ATM links 110, 120. In some cases video would be delivered only over the second ATM link 120 which is referred to as the working link. The second routing switch platform 142 is referred to as the working node, while the first routing switch platform 140 is referred to as the protection node. The protection node 140 acts as a backup for the working node 142, and is coupled to the video server 100 by the first ATM link 110 which is referred to as the protection link 110.

In the case of a failure 105 along for example the second ATM link 120 (indicated by an X in FIG. 1), the second routing switch platform 142 will send an alarm to the NMS 200 that the second ARM input interface 143 has failed, and the NMS 200 will understand that the second routing switch platform 142 can no longer act as the root node, and will assign a new root node to ensure delivery of service to the leaf node DSLAMs 301, 302, 303. In FIG. 1, the new root node would be the first routing switch platform 140 which before the failure was the protection node. In the case that video was previously delivered only over one link, namely wording ATM link 105, and if the NMS 200 has management capacity over the video server 100, the assignment of the first routing switch platform 140 as the new root node is accompanied by the NMS sending a directive to the video server 100 to transmit video to the first routing switch platform 140. In the case that video was being sent to both redundant nodes 140, 142, the assignment of the first routing switch platform 140 as the new root node causes video already arriving at the first routing switch platform to commence being broadcast therefrom.

To provide IPTV/Triple play services to its video subscribers, service providers are moving towards use of GigE/IP network infrastructure, especially at the video server end including the root or head end nodes of the network while keeping in the interim a large portion of the communications network 400 ATM infrastructure based. This is especially the case where P2MP connections are present since it is very difficult and costly to develop and implement a new VLAN based P2MP connection scheme. Keeping the ATM P2MP connections while improving delivery to the root nodes with GigE/IP would be less costly. Configuring monitoring, redundancy, and coordinating alarms become important issues to be resolved especially at points in the network where these two infrastructures (ATM and GigE/IP) are being integrated.

SUMMARY OF THE INVENTION

According to one aspect the invention provides for a routing switch platform comprising: a GigE/IP module having a GigE/IP interface coupled to a GigE/IP connection; an ATM module having an ATM interface coupled to an ATM connection; and a controller module coupled to said GigE/IP module and coupled to said ATM module, said controller module adapted to: associate a first flag received from said GigE/IP module with a first state of the ATM module; and associate a second flag received from said ATM module with a second state of the GigE/IP module.

In some embodiments of the invention the GigE/IP module and the ATM module are coupled to each other such that a payload of a data stream may pass through both the GigE/IP module and the ATM module.

In some embodiments of the invention the ATM connection is a point to multi-point (P2MP) ATM connection over which an ATM data stream is broadcast from the ATM module.

In some embodiments of the invention the GigE/IP connection is a GigE/IP link over which the GigE/IP module receives a GigE/IP data stream.

In some embodiments of the invention said controller module is further adapted to: upon receipt of the first flag from said GigE/IP module, generate a first alarm indication against said GigE/IP interface, generate an associated interface alarm indication against said ATM interface and forward said first alarm indication and said associated interface alarm indication to a network management system (NMS); and upon receipt of the second flag from said ATM module, generate a second alarm indication against said ATM interface, generate an associated GigE/IP alarm indication against said GigE/IP interface and forward said second alarm indication and said associated GigE/IP alarm indication to the NMS.

In some embodiments of the invention the GigE/IP module and the ATM module are coupled via at least an interworking function module, said interworking function module being adapted to receive said GigE/IP data stream from said GigE/IP module and to recast said GigE/IP data stream into said ATM data stream.

In some embodiments of the invention said payload comprises video for delivery to a number of video subscribers, wherein said interworking function module is adapted to when recasting said GigE/IP data stream, extract said payload from said GigE/IP data stream, read a VLAN identifier corresponding to a television channel from said GigE/IP data stream insert said payload into said ATM data stream with a VPI/VCI identifier corresponding to said television channel.

According to another aspect the invention provides for a method of operational status event monitoring comprising: monitoring a GigE/IP module of a routing switch platform; monitoring an ATM module of said routing switch platform; associating a first flag received from said GigE/IP module with a first state of the ATM module; and associating a second flag received from said ATM module with a second state of the GigE/IP module.

Some embodiments of the invention further provide for upon receipt of the first flag from said GigE/IP module: generating a first alarm indication against said GigE/IP module; generating an associated interface alarm indication against said ATM module; and forwarding said first alarm indication and said associated interface alarm indication to a network management system (NMS), and upon receipt of the second flag from said ATM module: generating a second alarm indication against said ATM module; generating an associated GigE/IP alarm indication against said GigE/IP module; and forwarding said second alarm indication and said associated GigE/IP alarm indication to the NMS.

In some embodiments of the invention the GigE/IP module and the ATM module are coupled to each other such that a payload may pass through the GigE/IP module in the form of the GigE/IP data stream and may pass through the ATM module in the form of the ATM data stream.

According to another aspect the invention provides for a controller module for controlling a routing switch platform adapted to monitor a GigE/IP module of a routing switch platform, monitor an ATM module of said routing switch platform, associate a first flag received from said GigE/IP module with a first state of the ATM module, and associate a second flag received from said ATM module with a second state of the GigE/IP module.

In some embodiments of the invention the controller module is further adapted to upon receipt of the first flag from said GigE/IP module generate a first alarm indication against said GigE/IP module, generate an associated interface alarm indication against said ATM module, and forward said first alarm indication and said associated interface alarm indication to a network management system (NMS), and upon receipt of the second flag from said ATM module, generate a second alarm indication against said ATM module, generate an associated GigE/IP alarm indication against said GigE/IP module, and forward said second alarm indication and said associated GigE/IP alarm indication to the NMS.

According to another aspect the invention provides for a system in a communications network comprising: a network management system (NMS); a video server; a working routing switch platform coupled to said video server over a first GigE/IP link and coupled to said NMS over a first control connection, said working routing switch platform comprising: a GigE/IP module having a GigE/IP interface coupled to said first GigE/IP link; an ATM module having an ATM interface coupled to an first ATM point to multipoint connection for delivery of video to a number of subscribers; and a controller module coupled to said GigE/IP module and coupled to said ATM module, said controller module adapted to: associate a first flag received from said GigE/IP module with a first state of the ATM module; and associate a second flag received from said ATM module with a second state of the GigE/IP module; and a redundant routing switch platform coupled to said video server over a second GigE/IP link and coupled to said NMS over a second control connection, said redundant routing switch platform coupled to a second ATM point to multipoint connection for delivery of said video to said number of subscribers.

In some embodiments of the invention controller module is further adapted to: upon receipt of the first flag from said GigE/IP module, generate a first alarm indication against said GigE/IP interface, generate an associated interface alarm indication against said ATM interface, and forward said first alarm indication and said associated interface alarm indication to the NMS; and upon receipt of the second flag from said ATM module, generate a second alarm indication against said ATM interface, generate an associated GigE/IP alarm indication against said GigE/IP interface and forward said second alarm indication and said associated GigE/IP alarm indication to the NMS.

In some embodiments the GigE/IP module receives an GigE/IP data stream over said GigE/IP link.

In some embodiments of the invention the NMS is adapted to upon receipt of said first alarm indication and said associated interface alarm indication, assign said redundant routing switch platform as a root node for broadcast of said video over said second ATM P2MP connection.

According to another aspect the invention provides for a method of redundant node protection of video delivery in a communications network comprising: receiving at a controller module of a routing switch platform a first flag associated with a GigE/IP interface of a GigE module of the routing switch platform receiving video over a GigE/IP link from a video server; generating at said controller module in response to receiving said first flag, a first alarm indication associated with said GigE/IP interface, and an associated interface alarm indication associated with an ATM interface of an ATM module of the routing switch platform receiving an ATM data stream comprising said video as payload; sending from the controller module to the a network management system (NMS) said first alarm indication and said associated interface alarm indication; a redundant routing switch platform coupled to said video server over a second GigE/IP link and coupled to said NMS over a second control connection, said redundant routing switch platform coupled to a second ATM point to multipoint connection for delivery of said video to said number of subscribers, receiving at said NMS said first alarm indication and said associated interface alarm indication; and assigning a redundant routing switch platform as a root node for broadcast of said video over a second ATM P2MP connection.

BRIEF DESCRIPTION OF THE DRAWINGS

The features and advantages of the invention will become more apparent from the following detailed description of the preferred embodiment(s) with reference to the attached figures, wherein.

It is noted that in the attached figures, like features bear similar labels.

DETAILED DESCRIPTION OF THE PREFERRED EMBODIMENTS

The preferred embodiment provides an interface association facility at the interface between GigE/IP infrastructure and ATM infrastructure of an IPTV/Triple play service delivery network. In particular the interface association is provided for an interface between the GigE/IP head end of the communications network, and the legacy ATM network coupled to leaf node DSLAMs which service the video subscribers. The interface association facility is provided at the routing switch platforms which connect on the server side (towards the video server) to GigE/IP and on the client side (towards the subscribers) to ATM.

Figure 2:
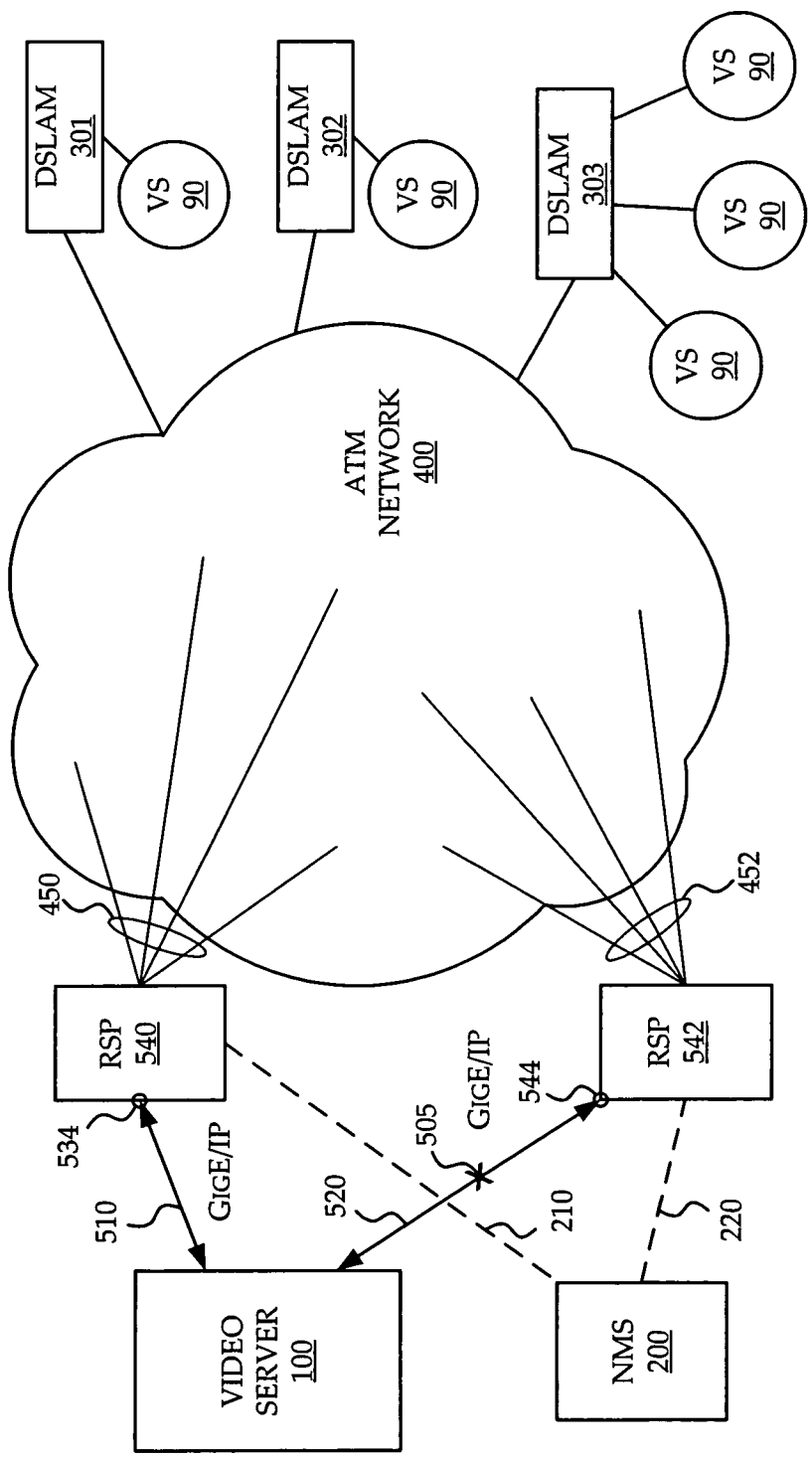
FIG. 2 is a block diagram of a system for providing In/triple play services over GigE/IP to redundant root nodes according to a preferred embodiment of the invention.

Referring now to FIG. 2, the system for IPTV/Triple play service delivery network (the communications network hereinafter) according to the preferred embodiment is discussed.

A video server 100 is coupled to a first routing switch platform 540 over a first GigE/IP link 510 and coupled to a second routing switch platform 542 over a second GigE/IP link 520. The first routing switch platform 540 acts as an ATM root node on the client side for a first P2MP ATM connection 450 delivering video to a number of video subscribers 90. The second routing switch platform 542 acts as an ATM root node on the client side for a second P2MP ATM connection 452 for delivering video to the video subscribers 90. A network management system (NMS) 200 monitors and administrates the first and second routing switch platforms 540 and 542 via a first control link 210 and a second control link 220 respectively. In the preferred embodiment this NMS 200 understands how to manage multi-endpoint paths (MEPs) such as the P2MP ATM connections 450, 452 on the ATM client side, and understands VLAN point to point (P2P) links 510, 520 on the GigE/IP server side. The NMS 200 is also capable of managing both GigE/IP and ATM infrastructure simultaneously, and capable of receiving and responding to alarms arriving therefrom.

The first and second routing switch platforms 540, 542 have respective first and second GigE/IP input interfaces 544, 534 coupled to the first and second GigE/IP links 510, 520 respectively.

The P2MP video signals propagate through the remaining ATM network 400 to leaf node DSLAMs 301, 302, 303 which finally are coupled to and deliver the video service to video subscribers 90. Two leaf node DSLAMs 301 and 302 are coupled to one video subscriber 90 each, while one leaf node DSLAM 303 is coupled to three video subscribers 90. In the system shown in FIG. 2, on the client side of the routing switch platforms 540, 542 each VPI/VCI or virtual channel over ATM corresponds to a single TV channel, while on the server side of the routing switch platforms 540, 542 each VLAN connection identified by a VLAN tag or ID corresponds to a single TV channel.

In the preferred embodiment, video streams are delivered at the same time over both the first and second GigE/IP links 510, 520. This enables management by the NMS 200 without having to configure or send commands to the video server 100. In some embodiments only a single video stream is delivered over a working link (for example the second GigE/IP link 520), while the first routing switch platform 540 acts as a backup and is coupled to the video server 100 via a protection link (for example the first GigE/IP link 510).

In the case of a failure 505 along the second GigE/IP link 520 (indicated by an X in FIG. 2), the NMS 200 will need to understand that there is a failure not only on the GigE/IP server side, but that the second routing switch platform 542 as a result cannot function as a root node for the second P2MP connection 452 on the ATM client side. The NMS 200 needs to understand this in order to assign a new root node to ensure delivery of service to the leaf node DSLAMs 301, 302, 303. In the known art, an NMS being aware of a GigE/IP node failure does not trigger an automatic recognition by the NMS that down stream ATM infrastructure is affected. To ensure the proper NMS 200 recognition of failure and corrective action, an alarm against the ATM root of the second P2MP ATM connection is provided by the second routing switch platform 542 by interface association according to the preferred embodiment of the invention.

Figure 3:
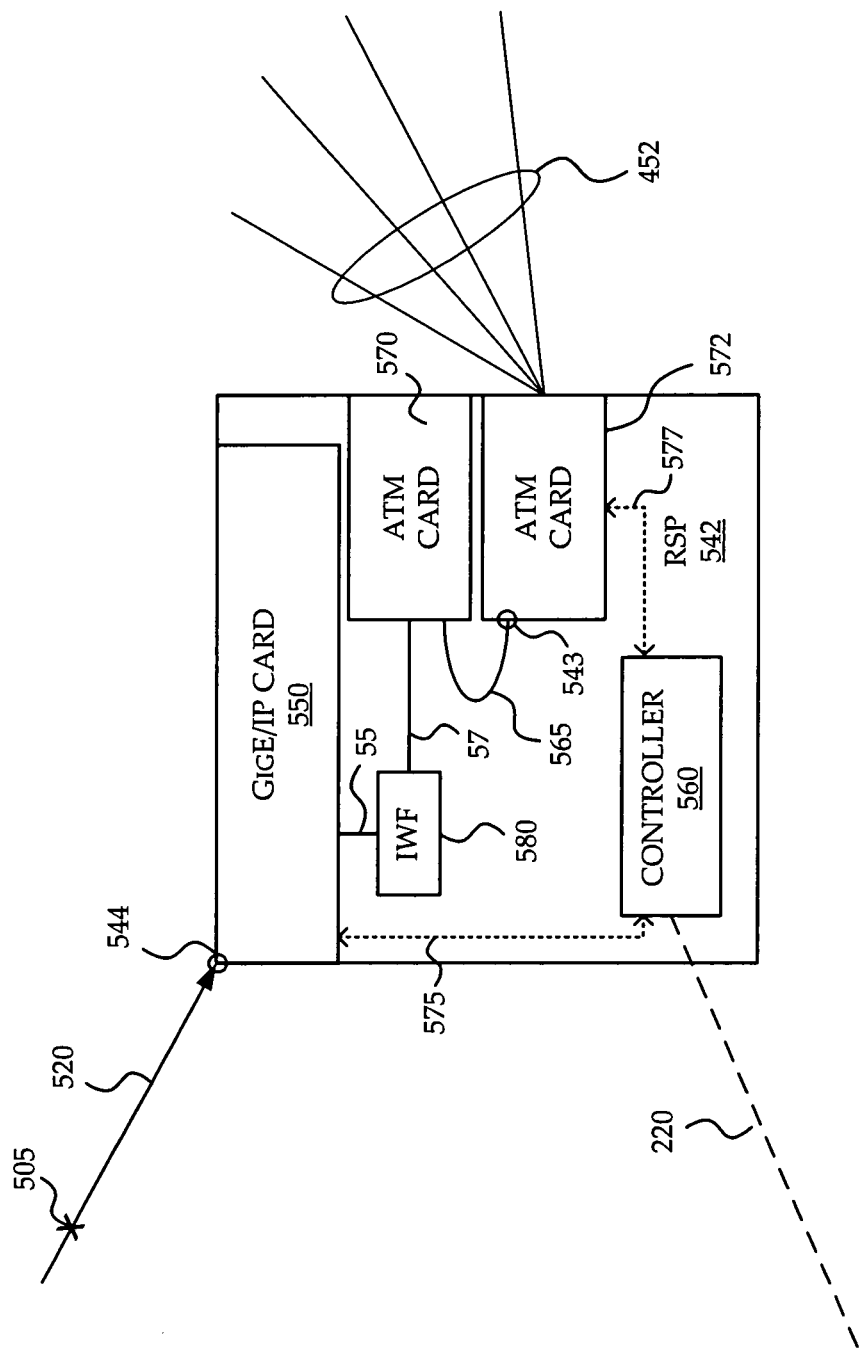
FIG. 3 is a block diagram of a root node providing interface association according to a preferred embodiment of the invention.

Referring also to FIG. 3, interface association at the second routing switch platform 5 acting as root node for the second P2P ATM connection 452 according to the preferred embodiment of the invention is discussed.

As discussed in association with FIG. 2, the second routing switch platform 542 is coupled by the second control link 220 to the NMS 200, coupled by the second GigE/IP link 520 to the video server 100 via the second GigE/IP input interface 544, and is coupled by the second P2MP ATM connection 452 to the leaf node DSLAMs 300, 301, 302 to deliver video to video subscribers 90.

A routing switch controller 560 is coupled to the second command link 220 and receives commands from and relays status information back to the NMS 200. The routing switch controller 560 controls and manages the general functioning of the second routing switch platform 542 including the raising and forwarding of alarms.

The second GigE/IP link 520 is coupled to the second GigE/IP input interface 544 of a GigE/IP card 550. GigE/IP card 550 is coupled to an interworking function (IWF) 580 via a first interworking connection 55. The IWF 580 is coupled to a first ATM card 570 by a second interworking connection 57. The first ATM card is connected via an ATM peer card connection 565 to a second ATM card 572. The second ATM card has an ATM input interface 543 which serves as the single root point for the second ATM point to multi-point connection 452. The routing switch controller 560 is linked via a GigE/IP card control connection 575 to the GigE/IP card 550, and is linked via an ATM card control connection 577 to the second ATM card.

The second routing switch platform of the preferred embodiment will now be discussed in terms of function.

The GigE/IP card 550 receives video streams labeled by a unique VLAN ID or tag for each TV channel, through the second GigE/IP input interface 544 from the second GigE/IP link 520. The GigE/IP card 550 outputs an IP data stream over the first interworking connection 55 to the IWF 580. The IWF 580 recasts the GigE/IP data stream by repackaging the IP packets into ATM cells. The IWF takes the data tagged with the VLAN tag corresponding to a particular TV channel, and inserts it into ATM cells along with the VPI/VCI identifier which corresponds to that particular TV channel on the ATM client side. A resulting ATM data stream is output from the IWF 580 over the second interworking connection 57. This ATM data stream is received by a first ATM card 570 which provides the ATM stream over the ATM peer card connection 565 to the ATM input interface 543 of the second ATM card 572. The single ATM input interface 543 of the second ATM card acts as the single root point for the second ATM point to multi-point connection 452. In this respect it functions in a similar manner to the ATM input interface 143 of the second RSP 142 of the prior art. The second ATM card 572 outputs ATM cell streams aver the second P2MP 452 towards the leaf node DSLAMs 300, 301, 302 and the recipient video subscribers 90.

In the event of a failure 505 in the second GigE/IP link, a flag would be raised by the GigE/IP card 550 indicating that the second GigE/IP input interface 544 was no longer functioning. This flag is received by the routing switch controller 560 over the GigE/IP card control connection 575. The routing switch controller 560 generates a first alarm against the GigE/IP input interface 544 and a second alarm against the single ATM input interface 543, and sends both alarms to the NMS 200 over the second control connection 220.

Figure 1:
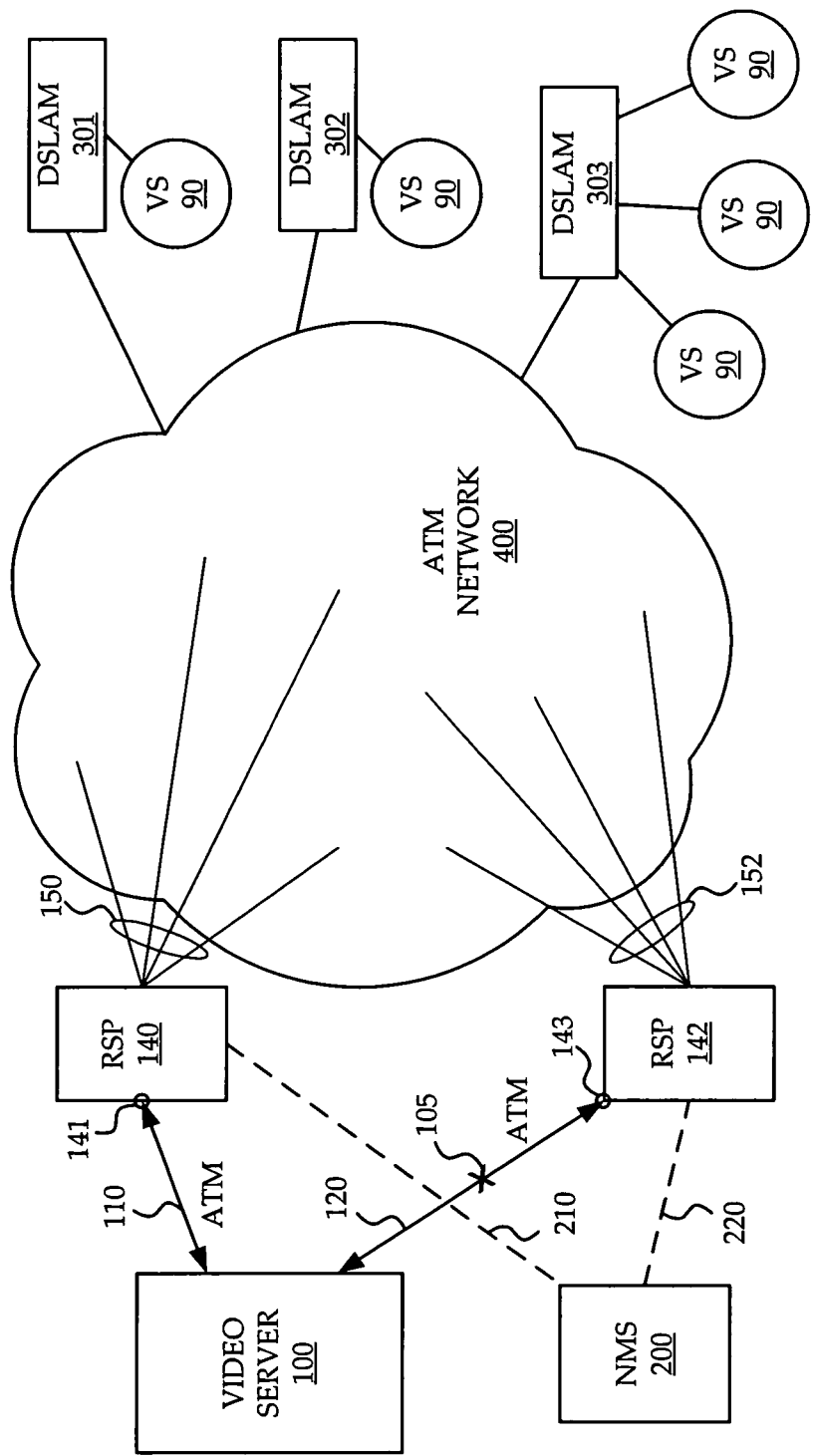
FIG. 1 is a block diagram of a known system for providing video services over redundant root nodes through a communications network to video subscribers.

Referring again to FIG. 2, the NMS 200 once receiving the alarm raised against the single ATM input interface 543 which acts as the single root point of the second P2MP connection 452, commences reassignment of the P2MP connection to the first routing switch 141. This occurs on the ATM management side of the NMS 200 without any modification to the software or hardware. This standard reassignment of the P2MP connection is possible because the single ATM input interface 543 of the preferred embodiment, as far as the NMS 200 is concerned, looks just like the second ATM input interface 143 of the second routing switch platform 142 of FIG. 1.

In the event of a failure in any of the first or second interworking connection 55, 57, the IWF 580, the first ATM card 570 or the ATM peer card connection 565, a flag would be raised by the second ATM card 572 indicating that the single ATM input interface 543 functioning as the root point of the second P2MP connection 452 was no longer functioning. This flag is received by the routing switch controller 560 over the ATM card control connection 577. The routing switch controller 560 generates a first alarm against the single ATM input interface 543 and a second alarm against the GigE/IP input interface 544, and sends both alarms to the NMS 200 over the second control connection 220.

Referring again to FIG. 2, the NMS 200 once receiving the alarm raised against the single ATM Input interface 543 which acts as the single root point of the second P2MP connection 452, commences reassignment of the P2MP connection to the first routing switch 141. The NMS 200 could also cause the video server 100 to stop transmitting the GigE/IP data stream traversing the second GigE/IP link 520 in the case that it is adapted to manage the video sever 100. In the that the NMS 200 is not adapted to manage the video server 100 and GigE/IP data streams are being sent over both the first and second GigE/IP links 510, 520, the NMS 200 can, when the first routing switch platform 540 has similar structure as the second routing switch platform 542, manage a similar GigE/IP card of the first routing switch platform to commence transmission of the data through its own interworking connections, IWF, and ATM cards and interfaces similar to those of the second routing switch platform 542. This management of the GigE/IP infrastructure occurs without any need of modification to the software or hardware of the NMS. This standard GigE/IP alarms and responses are possible because the second GigE/IP input interface 544 of the preferred embodiment, as far as the NMS 200 is concerned, looks just like any GigE/IP input interface of a point to point GigE/IP routing switch node.

Sending the alarm against the single ATM input interface 543 when an alarm is raised at the second GigE/IP input interface 544 is an example of interface association since the state or status of the single ATM input interface 543 has been associated with the alarm raised at the second GigE/IP interface 544. Similarly, sending of the alarm against the second GigE/IP input interface 544 when an alarm is raised at the single ATM input interface 543 is another example of interface association since the state or status of the second GigE/IP input interface 544 has been associated with the alarm raised at the single ATM input interface 543.

Advantageously, in some embodiments only the controller card 560 has its hardware and software modified to enable the system of interface association according to the preferred embodiment. The remaining ATM and GigE/IP elements may function as though they were in separate ATM and GigE/IP infrastructures respectively. Advantageously, the NMS 200 need not be modified at all to enable the system of interface association. The NMS 200 would simply monitor the server side of the routing switch platform as part of an ATM infrastructure and the client side as part of a GigE/IP infrastructure. The result is proper behavior on both sides in the event of a failure associated with the GigE/IP-ATM interface because it always sees two alarms, one for the GigE/IP side and one for the ATM side.

It should be noted that although a specific structure has been described between the GigE/IP card 550 and the second ATM card 572 in association with the preferred embodiment, other embodiments may have other structures therebetween as long as the GigE/IP stream is recast into an ATM stream for input into the single ATM input interface 543 acting as the root point of the second P2MP connection 452.

It also should be noted that although the preferred embodiment depicts only one pair of associated interfaces, any number of GigE/IP-ATM pair interfaces may be present in a single routing switch platform.

The embodiments presented are exemplary only and persons skilled in the art would appreciate that variations to the embodiments described above may be made without departing from the spirit of the invention. The scope of the invention is solely defined by the appended claims.

We claim:

1. A routing switch platform (RSP) comprising:
a first module having a first port coupled to a first protocol connection, the first module configured to generate a first flag in response to a failure of the first protocol connection, and generate a first failure indication in response to the generation of the first flag, wherein the first failure indication is associated with an operational status of the first protocol connection;
a second module having a second port coupled to a second protocol connection, the second module configured to generate a second flag in response to a failure of the second protocol connection, and generate a second failure indication in response to the generation of the second flag, wherein the second failure indication is associated with an operational status of the second protocol connection; and
a controller coupled to the first and second modules, the controller configured to associate the first port of the first module with the second port of the second module, wherein the first operational status of the first protocol connection is associated with the second operational status of the second protocol connection, and switchover the first port of the first module in response to the failure of the second protocol connection.

2. The RSP of claim 1, further comprising:
an interworking function module coupled to the first module that transmits a data stream in-band to the second module, wherein the interworking function module converts the data stream carried through the first protocol connection be carried through the second protocol connection, and the first and second modules transmit the first or second flags to the controller.

3. The RSP of claim 2, further comprising:
a third module coupled to the interworking function module and the second module that transmits the data stream from the interworking function module to the second module, wherein the third module acts as a single root point for the second module.

4. The RSP of claim 3, wherein the first module is a Gigabit Ethernet/Internet Protocol (GigE/IP) module, the second module is a P2MP ATM module, and the third module is an ATM module.

5. The RSP of claim 2, wherein the data stream includes a payload video for delivery to a plurality of video subscribers, wherein the interworking function module, when recasting the data stream in-band, is configured to extract the payload from the data stream in the first protocol connection, read a VLAN identifier corresponding to a television channel from the data stream in the first protocol connection, and insert the payload into the data stream in the second protocol connection with a VPI/VCI identifier corresponding to the television channel.

6. The RSP of claim 1, wherein the RSP is a root node for broadcast of data through the second protocol connection.

7. The RSP of claim 6, wherein the second module is a point to multi-point (P2MP) Asynchronous Transfer Mode (ATM) module that enables transmission of the data stream from the P2MP ATM module to a plurality of receivers through the second protocol connection.

8. The RSP of claim 1, wherein a network management system receives the first and second failure indications from the RSP and assigns a second RSP as a root node for broadcast of data through a third protocol connection.

9. A method of operational status event monitoring, the method comprising:
generating, by a first module in a routing switch platform (RSP), a first flag in response to a failure of a first protocol connection, wherein the first module has a first port coupled to the first protocol connection;
generating, by the first module, a first failure indication in response to the generation of the first flag, wherein the first failure indication is associated with a first operational status of the first protocol connection;
associating, by a controller in the RSP coupled to the first module and a second module, the first port of the first module with a second port of the second module, wherein the second port is coupled to a second protocol connection and further wherein the first operational status of the first protocol connection is associated with a second operational status of the second protocol connection;
receiving, by the controller, the first flag from the first module; and
generating, by the controller, a switchover of the first port of the first module in response to failure of the second protocol connection.

10. The method of claim 9, further comprising:
receiving, by an interworking function module in the RSP coupled to the first module, a data stream from the first protocol connection carried through the first module;
converting, by the interworking function module, the data stream carried through the first protocol connection to be carried through the second protocol connection; and
transmitting, by the interworking function module to the second module, the data stream to be carried through the second protocol connection,
wherein the first module transmits the first flag to the controller.

11. The method of claim 10, further comprising:
transmitting, by a third module coupled to the interworking function module and the second module, the data stream to be carried through the second protocol connection from the interworking function module to the second module, wherein the third module acts as a single root point for the second module.

12. The method of claim 11, wherein the first module is a Gigabit Ethernet/Internet Protocol (GigE/IP) module, the second module is a P2MP ATM module, and the third module is an ATM module.

13. The method of claim 10, wherein the data stream includes a payload video for delivery to a plurality of video subscribers, the method further comprising:
extracting, by the interworking function module, the payload from the data stream in the first protocol connection;
reading a VLAN identifier corresponding to a television channel from the data stream in the first protocol connection; and
inserting the payload in-band into the data stream in the second protocol connection with a VPI/VCI identifier corresponding to the television channel.

14. The method of claim 9, wherein the RSP is a root node for broadcast of data through the second protocol connection.

15. The method of claim 14, wherein the second module is a point to multi-point (P2MP) Asynchronous Transfer Mode (ATM) module that enables transmission of the converted data stream from the P2MP ATM module to a plurality of receivers through the second protocol connection.

16. The method of claim 9, further comprising:
receiving, by a network management system, the first and second failure indications from the RSP; and
assigning a second RSP as a root node for broadcast of data through a third protocol connection.

17. A system in a communications system comprising:
a first routing switch platform that is a root node for broadcast of data comprising:
a first module having a first port coupled to a first protocol connection, the first module configured to generate a first flag in response to a failure of the first protocol connection, and generate a first failure indication in response to the generation of the first flag, wherein the first failure indication is associated with an operational status of the first protocol connection;
a second module having a second port coupled to a second protocol connection, the second module configured to generate a second flag in response to a failure of the second protocol connection, and generate a second failure indication in response to the generation of the second flag, wherein the second failure indication is associated with an operational status of the second protocol connection; and
a controller coupled to the first and second modules, the controller configured to associate the first port of the first module with the second port of the second module, wherein the first operational status of the first protocol connection is associated with the second operational status of the second protocol connection, and switchover the first port of the first module in response to the failure of the second protocol connection;

a second routing switch platform with a redundant first protocol connection and a redundant second protocol connection; and a network management system connected to the first and second RSPs that receives the first and second failure indications from the first RSP and assigns the second RSP as the root node for broadcast of data through the redundant second protocol connection.

18. The system of claim 17, further comprising:

a first interworking function module coupled to the first module that transmits a data stream in-band to the second module, wherein the interworking function module converts the data stream carried through the first protocol connection be carried through the second protocol connection, and the first and second modules transmit the first or second flags to the controller.

19. The RSP of claim 18, wherein the data stream includes a payload video for delivery to a plurality of video subscribers, wherein the interworking function module, when recasting the data stream in-band, is configured to extract the payload from the data stream in the first protocol connection, read a VLAN identifier corresponding to a television channel from the data stream in the first protocol connection, and insert the payload into the data stream in the second protocol connection with a VPI/VCI identifier corresponding to the television channel.

20. The system of claim 17, further comprising:

a third module in the first RSP coupled to the first interworking function module and the second module that transmits the data stream in-band from the interworking function module to the second module, wherein the third module acts as a single root point for the second module.

21. The system of claim 17, wherein the second module is a point to multi-point (P2MP) Asynchronous Transfer Mode (ATM) module that enables transmission of the data stream from the P2MP ATM module to a plurality of receivers through the second protocol connection.

* * * * *